(12) United States Patent
Delaunay

(10) Patent No.: US 11,636,060 B2
(45) Date of Patent: Apr. 25, 2023

(54) USB CONNECTOR DEVICE

(71) Applicant: STMicroelectronics (Grand Ouest) SAS, Le Mans (FR)

(72) Inventor: Amelie Delaunay, Spay (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 0 days.

(21) Appl. No.: 17/075,296

(22) Filed: Oct. 20, 2020

(65) Prior Publication Data

US 2021/0124707 A1    Apr. 29, 2021

(30) Foreign Application Priority Data

Oct. 24, 2019  (FR) ...................................... 1911938

(51) Int. Cl.
*G06F 13/40*  (2006.01)
*G06F 13/42*  (2006.01)

(52) U.S. Cl.
CPC ...... *G06F 13/4068* (2013.01); *G06F 13/4022* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 7,000,057 B1 * | 2/2006 | Novell | G06F 13/385 709/209 |
| 7,502,878 B1 | 3/2009 | Wright | |
| 2005/0262279 A1 * | 11/2005 | Overtoom | H01R 31/065 710/62 |
| 2006/0095642 A1 * | 5/2006 | Hesse | G06F 13/385 710/313 |
| 2007/0180181 A1 * | 8/2007 | Chen | G06F 13/4022 710/313 |
| 2007/0239924 A1 * | 10/2007 | Foo | H04N 21/43632 710/316 |
| 2007/0255885 A1 | 11/2007 | Bohm et al. | |
| 2008/0222341 A1 * | 9/2008 | Lin | G06F 13/426 710/316 |
| 2009/0240851 A1 * | 9/2009 | Saito | G06F 13/38 710/56 |
| 2013/0275640 A1 * | 10/2013 | Wang | G06F 13/4081 710/300 |
| 2015/0074323 A1 * | 3/2015 | Chumbalkar | G06F 13/40 710/316 |
| 2017/0255585 A1 * | 9/2017 | Zhang | G06F 13/4022 |
| 2018/0336151 A1 * | 11/2018 | Moore | G06F 13/382 |

FOREIGN PATENT DOCUMENTS

| | | |
|---|---|---|
| CN | 103999066 A | 8/2014 |
| WO | 2012056043 A1 | 5/2012 |
| WO | 2015081448 A1 | 6/2015 |
| WO | 2018107281 A1 | 6/2018 |

\* cited by examiner

*Primary Examiner* — Henry Tsai
*Assistant Examiner* — Harry Z Wang
(74) *Attorney, Agent, or Firm* — Slater Matsil, LLP

(57) ABSTRACT

An electronic device includes a connector (e.g., a USB connector), a first element configured to operate the connector as a host device connector, a second element configured to operate the connector as a peripheral device connector, and a third element configured to generate a first signal upon connection of the connector. The first signal is indicative of whether the device is to operate as a host device or a peripheral device.

22 Claims, 3 Drawing Sheets

USB CONNECTOR DEVICE

CROSS-REFERENCE TO RELATED APPLICATIONS

This application claims priority to French Patent Application No. 1911938, filed on Oct. 24, 2019, which application is hereby incorporated herein by reference.

TECHNICAL FIELD

The present disclosure generally concerns electronic devices and in particular embodiments to a USB connector device.

BACKGROUND

The term "Universal Serial Bus" or USB is a standard relative to a serial computer bus which is used to connect electronic devices to a computer or to any type of device provided for this purpose (tablet, smartphone, etc.). A USB bus may supply certain electronic devices (e.g., USB key, SSD disks, etc.). A USB bus thus allows the communication of data between electronic devices and enables electric power to be supplied to one of the electronic devices.

SUMMARY

The present disclosure generally concerns electronic devices. Particular embodiments relate to electronic devices with a USB connector, for example, electronic devices with a USB-C connector.

An embodiment overcomes all or part of the disadvantages of known electronic devices comprising a USB connector.

An embodiment provides an electronic device that comprises a USB connector, a first element configured to operate the connector in the role of a host device, a second element configured to operate the connector in the role of a peripheral device, and a third element configured to generate a first signal representative of the role of the device on connection of the connector.

According to an embodiment, the connector is a USB-C connector.

According to an embodiment, the first and second elements are controllers.

According to an embodiment, the second element is a DRD controller.

According to an embodiment, the first signal is a binary signal.

According to an embodiment, the third element is configured to deliver the first signal to a fourth element, the fourth element being configured to select, according to the value of the first signal, from among the first element and the second element, the element which manages the operation of the connector.

According to an embodiment, the fourth element enables to control a UTMI switch.

According to an embodiment, the third element is configured to transmit an interrupt signal on connection of the connector.

According to an embodiment, the third element is configured to transmit an interrupt signal on disconnection of the connector.

Another embodiment provides a method of operation of an electronic device comprising a USB connector, a first element configured to operate the connector in the role of a host device, a second element configured to operate the connector in the role of a peripheral device, the method comprising, on connection of the connector, the generation of a first signal representative of the role of the device on connection of the connector.

According to an embodiment, the method comprises the selection, by a fourth element, according to the value of the first signal, among the first element and the second element, of the element which manages the connector operation.

According to an embodiment, the method comprises a step of sending of an interrupt signal by the third element on disconnection of the connector.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the different electronic devices and their applications are not described in detailed, the embodiments being adapted to all devices comprising a USB connector.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
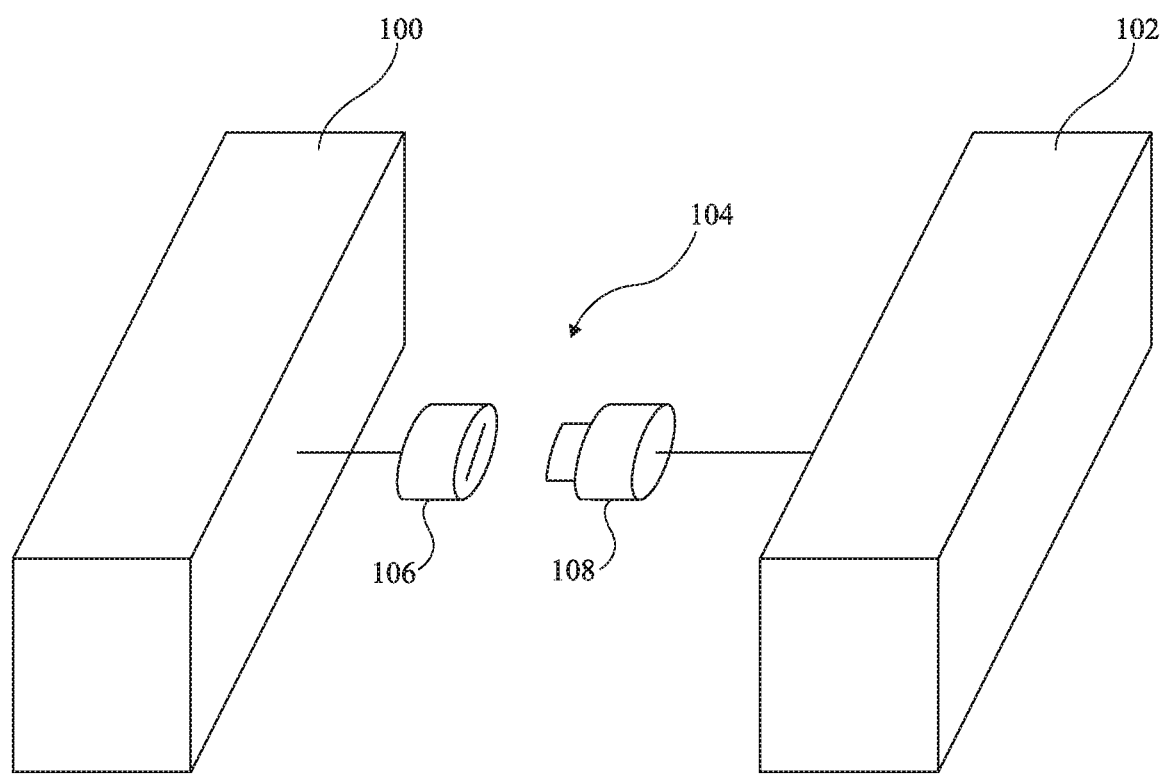
FIG. 1 shows devices capable of being coupled by a USB bus.

FIG. 1 shows devices 100 and 102 capable of being coupled by a wire connection 104. The wire connection is a USB (Universal Serial Bus) connection. In this context, USB refers to compatibility with any version USB effective at the priority date.

A USB connection is made via a female connector and a male connector. The male and female connectors are in physical contact when the connection is performed.

Devices 100 and 102 comprise complementary connectors, that is, a male connector and a female connector. In the example of FIG. 1, device 100 comprises a female connector 106 and device 102 comprises a male connector 108. In the example of FIG. 1, connectors 106 and 108 are not connected.

Wire connection 104 may be formed by connecting connector 106 to connector 108. Other connections to device 100 may be formed by connecting connector 106 to another device by means of another male connector. Similarly, other connections with device 102 may be formed by connecting connector 108 to another device by means of another female connector.

The devices may be as a variation coupled by one or a plurality of USB cables. In the case of FIG. 1, devices 100 and 102 may be coupled by a cable comprising a male connector at one end and a female connector at the other end. In the case of two devices having connectors of the same type, generally female, the devices may then be coupled by a cable comprising male-type connectors at its two ends.

During the operation of devices 100 and 102, and more particularly during the operation of wire connection 104, one of the devices has the role of a host and the other device has the role of a peripheral. In other words, during the operation of wire connection 104, one of the devices is a host and the other device is a peripheral. The host/peripheral relation is similar to a master/slave relation between electronic devices.

In the example of FIG. 1, the host is, for example, device 100 and the peripheral is, for example, device 102.

Among devices in a host/peripheral relationship, the host device is the device supplying a current to the peripheral device. The host device may thus, for example, supply the electric power enabling the peripheral device to operate. Further, the host device initiates all the data exchanges between the peripheral device and the host device. The host device, for example, sends control signals to the peripheral device. The peripheral device only takes part in the connection, for example, by supplying data or by executing instructions, on request of the host device.

For example, in a USB connection between a computer and a keyboard, the computer is the host and the keyboard is the peripheral. Indeed, the keyboard is powered by the computer via the USB connection. Similarly, in a USB connection between a computer and a mouse, the computer is the host and the mouse is the peripheral.

Certain devices, such as for example, keyboards, mice, or memory storage devices, are always peripherals during a USB connection. Similarly, certain devices are always host devices during a USB connection.

Other devices may, according to the device to which they are connected by USB connection, be hosts or peripherals. For example, in a USB connection between a cell phone or a tablet and a computer, the computer is the host and the phone or the tablet is the peripheral. However, in a USB connection between a cell phone or a tablet and a memory storage device, the phone or the tablet is the host and the memory storage device is the peripheral.

In the example of FIG. 1, the connection is preferably a C-type USB connection, or USB-C connection. Connectors 106 and 108 are connectors capable of forming a C-type USB connection, or USB-C connection. Connectors 106 and 108 are C-type USB connectors, or USB-C connectors.

USB-C connections are designed for many uses. In particular, USB-C connections may allow the electric power supply of connected devices, data transfer, audio cable connection, video output connection, etc.

Type C is a USB connection standard. Type C is to be differentiated from the previously-existing types A and B. In particular, USB-C connections are reversible, that is, each connector is symmetrical according to two perpendicular axes and can thus be connected to an additional connector in a first direction, or in a second direction opposite to the first direction. Further, a device may be, via a USB-C connector, a host in a connection with a device and may be, via the same connector, a peripheral in a connection with another device.

Thus, in the example of FIG. 1, devices 100 and 102 may respectively be the peripheral and the host or be the host and the peripheral. However, devices comprising a male-type connector generally are peripherals.

For example, at least one of the devices may have more than two USB connectors. For example, certain devices may have at least two female connectors. For example, certain connectors may be of different types. For example, a device may comprise at least one USB-C connector and at least one connector of USB-A or USB-B type.

Figure 2:
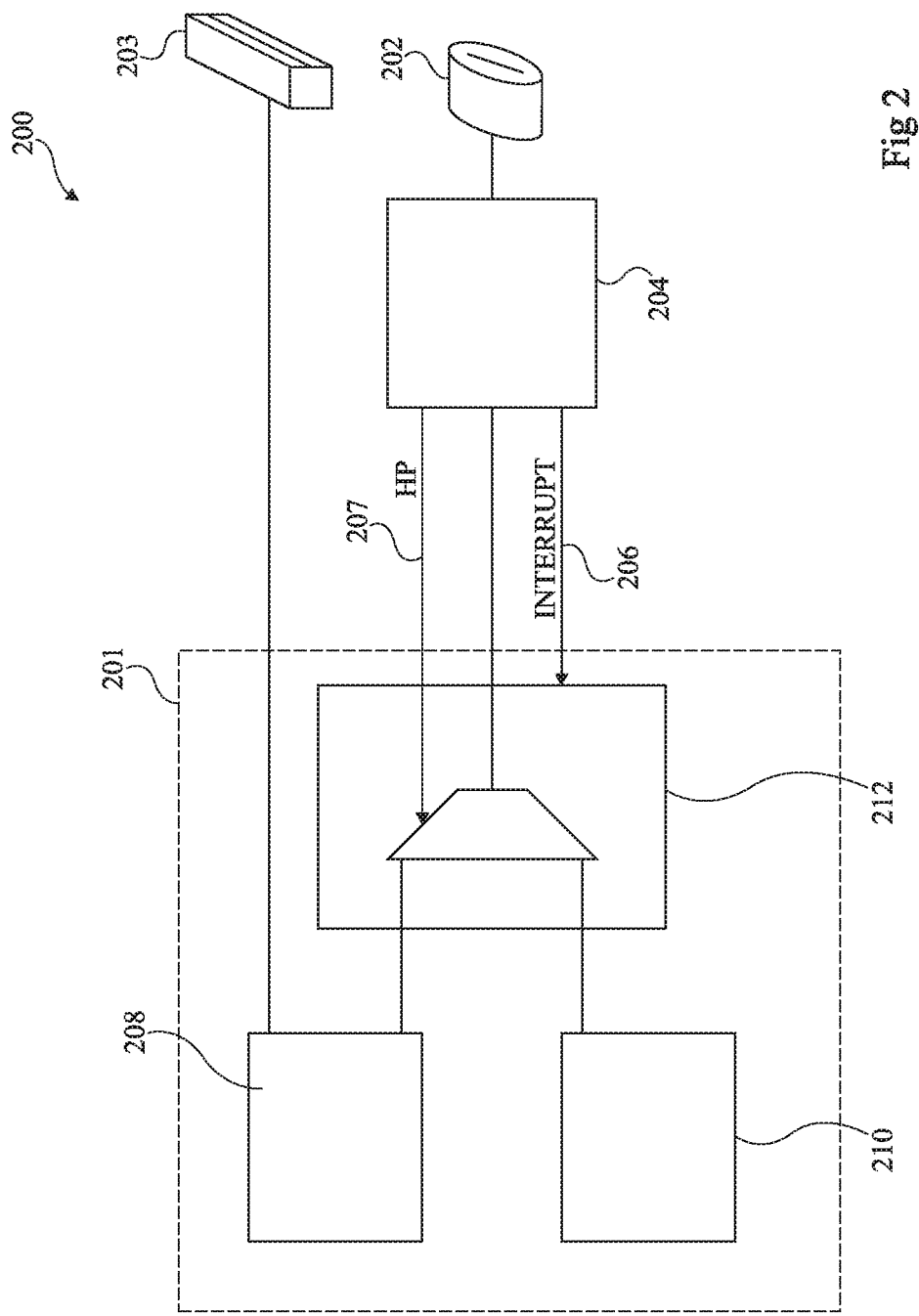
FIG. 2 shows an embodiment of an electronic device.

FIG. 2 shows an embodiment of an electronic device 200. The electronic device is, for example, capable of exchanging data over a USB bus according to the USB 3.2 standard and/or to the USB 2.0 standard.

Device 100 comprises a set 201 of functions capable of being implemented in digital or analog form, and at least one connector 202. In the example of FIG. 2, device 200 comprises a connector 202 and a connector 203. Preferably, assembly 201 comprises at least one chip. Set 201 preferably comprises at least one microcontroller or one microprocessor. Preferable, set 201 may implement software and implements an operating system, for example, Linux.

In FIG. 2, connector 202 is a USB-C connector. The shown connector 202 is a female connector. Thus, device 200 is, for example, the device 100 or the device 102 of FIG. 1. Device 200 is capable of being connected to an electronic device, not shown, directly or via a USB cable.

Connector 202 is coupled, preferably connected, to a circuit 204 for controlling connector 202 or connector driver.

Connector control circuit 204 is preferably configured to transmit an interrupt signal 206 INTERRUPT. Interrupt signal 206 INTERRUPT is transmitted when a device, not shown, is connected to device 200 via connector 202. Signal 206 INTERRUPT is thus transmitted for each connection of connector 202 to a device, not shown.

Preferably, circuit 204 is also configured to transmit an interrupt signal on disconnection of the device, not shown, capable of being the same interrupt signal or a signal different from the signal transmitted during the connection.

In one example, the device (not shown) comprises the same elements as the device 200 described in relation with the USB link, that is, for example comprises a connector complementary to the connector of device 200 (a male connector in the example of FIG. 2), and connection control circuits similar to the connection control circuits which will be described hereafter.

Thus, when a USB connection is formed between device 200 and the device which is not shown, via connector 202, signal 206 INTERRUPT is supplied by circuit 204 to the rest of device 200, preferably to all the elements of device 200.

Further, circuit 204 is configured to generate a signal 207 (HP) representative of the role of each device in the connection between device 200 and the device which is not shown. The term role of one of the devices in the connection means the role of a host device or of a peripheral device. Signal HP, for example, takes a first value if device 200 is a host device and the device which is not shown is a peripheral device and a second value if device 200 is a peripheral device and the device which is not shown is a host device.

For example, this information is contained in a register of device 200. This is, for example, true when device 200 can only operate as a host device or as a peripheral device.

The information relative to the role of the devices may be obtained by circuit 204 by other means.

Signal 207 is preferably transmitted by an I2C (Inter Integrated Circuit) bus comprising a data transmission bus and a clock bus. As a variation, signal 207 may be contained in a register, and may be accessible to device 200.

Device 200 further comprises, in assembly 201, functions or elements 208 and 210. Elements 208 and 210 are preferably circuits, for example, located on a chip of assembly 201.

Elements 208 and 210 are elements, preferably circuits, for controlling connector 202. Elements 208 and 210 are, for example, configured to operate connector 202. Circuits 208 and 210 are, for example, controllers of connector 202.

Circuit 208 is, for example, a circuit configured to operate connector 202 in host mode. Circuit 208 is, for example, configured to supply current to the device which is not shown. Circuit 208 is, for example, configured to initiate and ensure the data transfer with a peripheral device, not shown.

Circuit 210 is, for example, a circuit configured to operate the connector in peripheral mode. Circuit 201 is, for example, configured to manage the connection with a host device, not shown.

Preferably, circuit 210 is a circuit enabling to operate the device in DRD (Dual Role Device) mode. Circuit 210 is thus configured to be able to operate device 200 in the role of a host or in the role of a peripheral. Preferably, device 208 can only operate the device in the role of a host.

It would be possible to operate connector 202 in the role of a host by using circuit 210 as the controller of connector 202. However, circuit 208 allows a higher transfer speed than circuit 210 when the connector operates in the role of a host.

Device 200 comprises a function or an element 212. Element 212 is, for example, a circuit or software. Preferably, element 212 is software implemented by a microprocessor or a microcontroller. Preferably, element 212 is implemented in a Linux system. Preferably, element 212 controls a UTMI (USB Transceiver Macrocell Interface) switch.

More generally, element 212 is configured to select which element, among elements 208 and 210, operates the connector, for a given connection. Element 212 receives the signal 206 and signal 207 delivered by element 204 respectively concerning the state of the connection, that is, if there has been a connection or a disconnection, and the role (host or peripheral) of device 200 in the connection.

The information provided by circuit 204 (signal 207 and signal 206) is preferably accessible by all the elements (circuits or software) of assembly 201, and in particular by elements 208, 210, and 212. The information relative to the role of the devices is thus accessible by all the elements of device 200, and in particular by element 212.

Connector 203 is, for example, a USB connector, for example, of type A or B. In the example of FIG. 2, connector 203 is a type-A USB connector. The connector is coupled to element 208. The element operating connector 203 is preferably not selected by an element such as element 212. The operation of connector 203 is managed by element 208, whatever the device having connector 203 connected thereto. Similarly, a connector, not shown, could be coupled to element 210. The operation of such a connector, not shown, would then be managed by element 210, whatever the device connected to the connector which is not shown.

Figure 3:
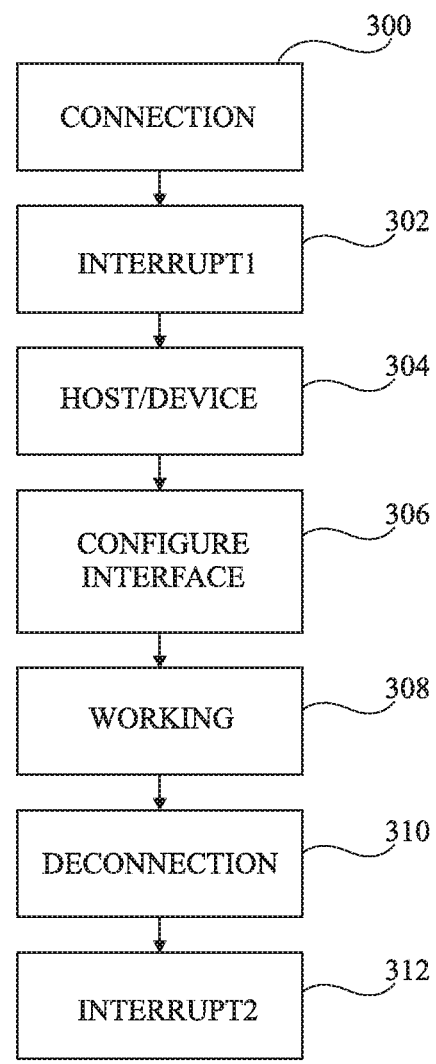
FIG. 3 shows an embodiment of an electronic device operating method.

FIG. 3 shows an embodiment of an electronic device operating method. For example, FIG. 3 shows an operating method of a first device on connection thereof to a second device. The first and second devices are, for example, devices such as the device 200 of FIG. 2. Preferably, the method is implemented by the first and second devices in parallel during the connection. The operating method is described in relation with the first device. The steps of the method are preferably successive.

During an operating step 300 (CONNECTION), a connection is performed between the first and second devices. The connection is performed via USB-C connectors. A USB-C connection is thus arranged between the first and second devices. The connection between the first and second devices is performed by connecting a USB-C connector of the first device to a USB-C connector of the second device.

During another operating step 302 (INTERRUPT1), an interrupt signal INTERRUPT is transmitted by the circuit 204 (FIG. 2) of the first device. The interrupt signal is, for example, made accessible to all the components and all the software of assembly 201, preferably at least accessible to element 212. Signal INTERRUPT delivers the information according to which the connector 202 of the first device has been connected to a connector of another device, here, the second device.

During another step 304 (HOST/DEVICE) of the method, circuit 204 determines whether the first device is the host or the peripheral in the connection with the second device. Signal 207, representative of the respective role of the devices of the connection, is, for example, obtained from the second device.

Signal 207 is, for example, made accessible to all the components and to all the software of assembly 201, preferably at least accessible to element 212.

For example, signal 207 is a binary signal, that is, capable of taking two different values. Signal 207 takes a first value if the first device is the host and a second value if the first device is the peripheral.

During another step 306 (CONFIGURE INTERFACE) of the method, element 212 selects, according to signal 207, element 208 or element 210. A communication or link is thus formed between connector 202 and the selected element, allowing the data and power transfer.

For example, in the case where signal 207 is a binary signal, if signal 207 has the first value, the operation of connector 202 is managed by element 208, and if signal 207 has the second value, the operation of connector 202 is managed by element 210.

Preferably, elements 208 and 210 do not operate at the same time. Preferably, the operation of a connector, connector 203 in the present example, is managed by a single element 208 or 210.

During another step 308 (WORKING), the USB connection and the devices are operating. Data and/or power exchanges are carried out.

During another step 310 (DISCONNECTION), the connectors 202 of the first and second devices are disconnected.

During another step 312 (INTERRUPT2), an interrupt signal is supplied by element 204. Interrupt signal INTERRUPT is, for example, accessible to all the components and all the software of assembly 201 preferably at least accessible to element 212.

An advantage of the described embodiments is that it allows a higher transmission rate between the devices of the connection than in a connection only managed by a circuit such as circuit 210, enabling to operate the device in dual role device mode.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional indications provided hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic device comprising:
    a first connector;
    a second connector;
    a first controller circuit configured to:
        operate the first connector as a host device connector in response to the second connector being disconnected and the first connector being coupled to a first host device, and
        operate the second connector as a host device connector in response to the second connector being coupled to a second host device;
    a second controller circuit being a dual role device (DRD) and configured to:
        operate the first connector as a host device connector in response to the first connector coupled to the first host device or a third host device and the second connector coupled to the second host device, and
        operate the first connector as a peripheral device connector in response to the first connector coupled to a first peripheral device; and
    a third controller circuit configured to generate a first signal upon connection of the first connector, the first signal indicative of whether the electronic device is to operate as a host device or a peripheral device, the third controller circuit configured to exchange data and power between the first connector and the second controller circuit.

2. The device according to claim 1, wherein the first connector is a Universal Serial Bus (USB) connector.

3. The device according to claim 2, wherein the first connector is a USB-C connector and the second connector is a USB-A connector.

4. The device according to claim 1, wherein the first and second controller circuits are controllers.

5. The device according to claim 1, wherein the first signal is a binary signal.

6. The device according to claim 1, further comprising a controller coupled to the third controller circuit, the controller being configured to select, according to the value of the first signal, which controller circuit from among the first controller circuit and the second controller circuit is to operate the first connector.

7. The device according to claim 6, wherein the first connector is a USB connector and wherein the controller is configured to control a UTMI (USB Transceiver Macrocell Interface) switch.

8. The device according to claim 1, wherein the third controller circuit is configured to transmit an interrupt signal upon connection of the first connector.

9. The device according to claim 1, wherein the third controller circuit is configured to transmit an interrupt signal upon disconnection of the first connector.

10. An electronic device comprising:
    a first Universal Serial Bus (USB) connector couplable to a first device;
    a second USB connector couplable to a second device;
    a first controller circuit configured to:
        operate the first USB connector as a host device connector in response to the second USB connector being disconnected and the first USB connector being coupled to a first host device, and
        operate the second USB connector as a host device connector in response to the second USB connector being coupled to a second host device;
    a second controller circuit being a dual role device (DRD) and configured to:
        operate the first USB connector as a host device connector in response to the first USB connector coupled to the first host device or a third host device and the second USB connector coupled to the second host device, and
        operate the first USB connector as peripheral device connector in response to the first USB connector coupled to a first peripheral device;
    a UTMI (USB Transceiver Macrocell Interface) switch coupled between the first and second controller circuits and the first USB connector; and
    an interface circuit configured to determine whether the device is to operate as a host device or a peripheral device so that the UTMI switch can couple one of the first controller circuit or the second controller circuit to the first USB connector, the interface circuit configured to provide data and power exchange between the first USB connector and the second controller circuit through the interface circuit.

11. The device according to claim 10, wherein the interface circuit is configured to generate a first signal upon connection of the first USB connector, the first signal indicative of whether the device is to operate as a host device or a peripheral device.

12. The device according to claim 11, further comprising a control circuit configured to receive the first signal from the interface circuit and to control the UTMI switch in accordance with the first signal.

13. The device according to claim 12, wherein the interface circuit is configured to transmit a first interrupt signal to the control circuit upon connection of the first USB connector and to transmit a second interrupt signal to the control circuit upon disconnection of the first USB connector.

14. The device according to claim 10, wherein the first controller circuit is further configured to operate the second USB connector independent of the UMTI switch and the interface circuit.

15. The device according to claim 7, wherein the third controller circuit is coupled between the UTMI switch and the first connector.

16. A method of operating a first device, the method comprising:
    transmitting a first interrupt signal from a connector control circuit to a controller, the first interrupt signal comprising information that a first connector of the first device has been connected to a connector of a second device;

generating, based on information from the second device, a first signal indicative of whether the first device is to operate as a host device or a peripheral device in the connection with the second device;

providing the first signal to the controller configured to select between a first controller circuit and a second controller circuit;

determining a selected controller circuit by selecting, according to the first signal, between the first controller circuit and the second controller circuit; and managing, by the selected controller circuit, an operation of the connector of the first device to establish a connection configured to exchange data and power between the first device and the second device, the managing comprising operating the first device as a host device when the first signal indicates that the first device is to operate as a host device and operating the first device as a peripheral device when the first signal indicates that the first device is to operate as peripheral, wherein a second connector of the first device is disconnected and the first connector is coupled to a first host device and, in response, the first controller circuit operates the first connector as a host device connector, wherein the second connector is coupled to a second host device and, in response, the first controller circuit operates the second connector as a host device connector, wherein the first connector is coupled to the first host device or a third host device and the second connector is coupled to the second host device and, in response, the second controller circuit operates the first connector as a host device connector, the second controller circuit being a dual role device (DRD), and wherein the first connector is coupled to a first peripheral device and, in response, the second controller circuit operates the first connector as a peripheral device connector.

17. The method of claim 16, further comprising disconnecting the connector of the first device from the first connector of the second device.

18. The method according to claim 17, further comprising generating a second interrupt signal upon disconnection of the first connector.

19. The method according to claim 16, wherein the first signal indicates that the device is to operate as the host device, the method further comprising supplying current from the first device to the second device.

20. The method according to claim 16, wherein the first signal indicates that the first device is to operate as the host device, the method further comprising initiating a transfer of data from the first device to the second device.

21. The method according to claim 16, wherein the first connector is a Universal Serial Bus (USB) connector and wherein the controller is configured to control a USB Transceiver Macrocell Interface (UTMI) switch.

22. The device according to claim 11, wherein the first signal is a binary signal.

* * * * *